United States Patent [19]

Zwan

[11] Patent Number: 5,291,830
[45] Date of Patent: Mar. 8, 1994

[54] DUAL-MODE SEMI-PASSIVE NOSETIP FOR A HYPERSONIC WEAPON

[75] Inventor: Allen D. Zwan, San Diego, Calif.

[73] Assignee: Lockheed Corporation, Fort Worth, Tex.

[21] Appl. No.: 969,611

[22] Filed: Oct. 30, 1992

[51] Int. Cl.$^5$ .............. B64G 1/22; F42B 10/00
[52] U.S. Cl. .............. 102/293; 244/117 A; 244/158 A
[58] Field of Search ........... 102/293; 244/117 A, 244/121, 158 A

[56] References Cited

U.S. PATENT DOCUMENTS

| | | | |
|---|---|---|---|
| 2,922,291 | 1/1960 | Fox et al. | 62/171 |
| 3,014,353 | 12/1961 | Scully et al. | 244/117 A |
| 3,159,012 | 12/1962 | Brunner | 244/117 A |
| 3,267,857 | 8/1966 | Lindberg, Jr. | 244/158 A |
| 3,596,604 | 8/1971 | Corkery | 102/293 |
| 3,682,100 | 8/1972 | Lindberg, Jr. | 244/158 A |
| 3,785,591 | 1/1974 | Stalmach, Jr. | 244/117 A |
| 4,671,348 | 6/1987 | Bauer | 244/117 A |
| 4,739,952 | 4/1988 | Giles | 244/117 A |
| 4,949,920 | 8/1990 | Schindel et al. | 244/117 A |

Primary Examiner—Harold J. Tudor
Attorney, Agent, or Firm—Frank D. Gilliam

[57] ABSTRACT

A dual mode semi-passive nosetip cooling system for a hypersonic weapon. A cone shaped capsule or pressure vessel is positioned within the nosetip and it is filled with a sublimating material in solid state. The capsule has a nozzle formed adjacent its forward end that directs a steady impingement stream of sublimation material to the back side of the nosetip shell in its stagnation region when the sublimating material is being heated by the surface heat on the nosetip itself. The concept is based on utilizing the advantages of both a subliminating and impingement cooling system designs.

6 Claims, 3 Drawing Sheets

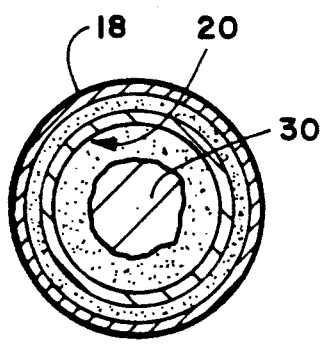
FIGURE 2
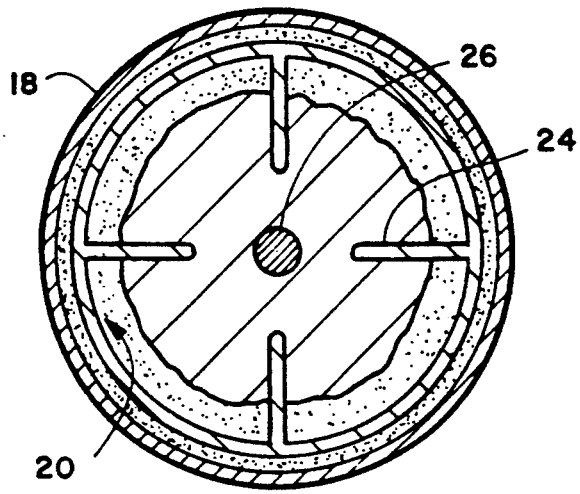
FIGURE 3
FIGURE 5
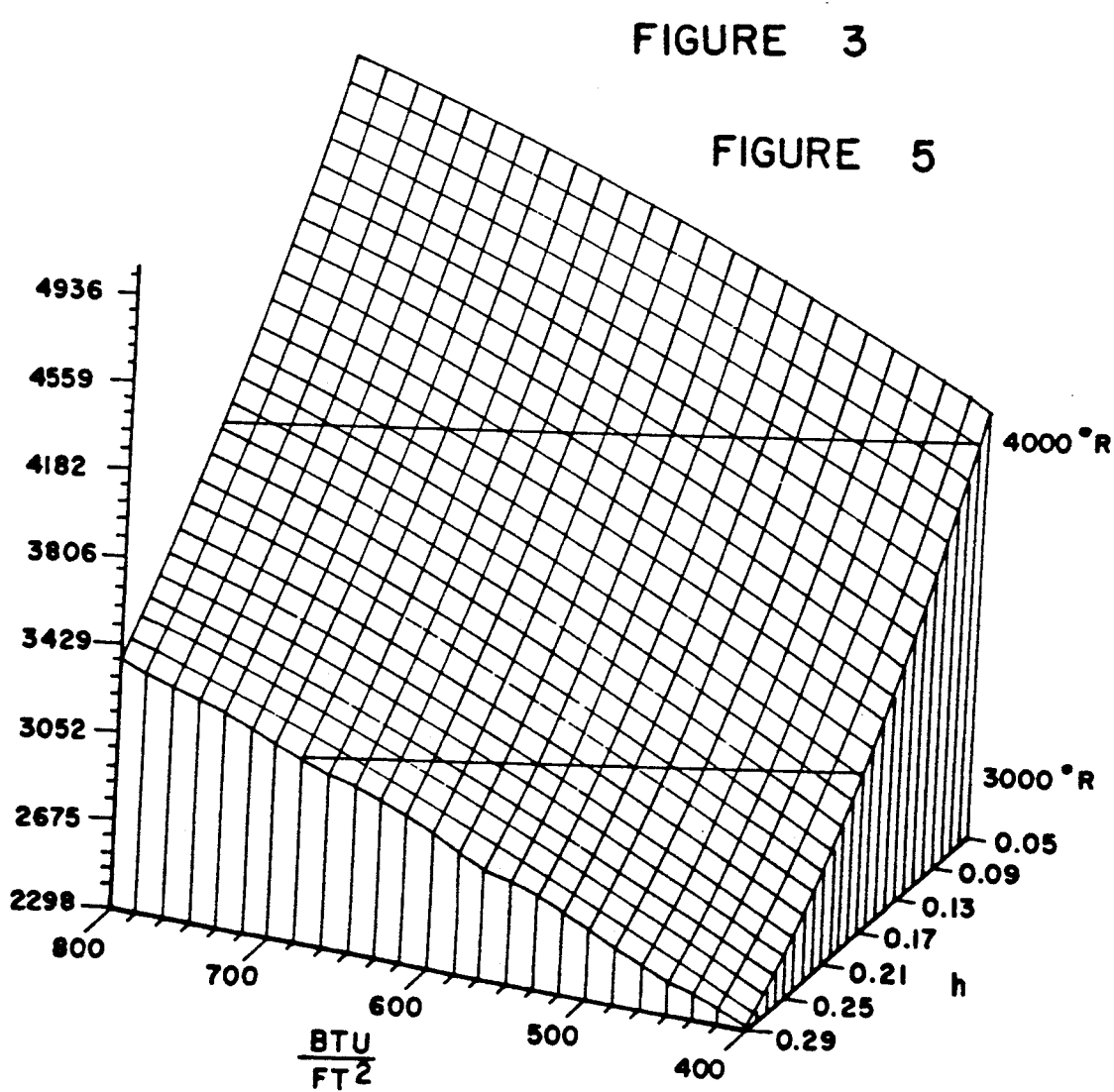

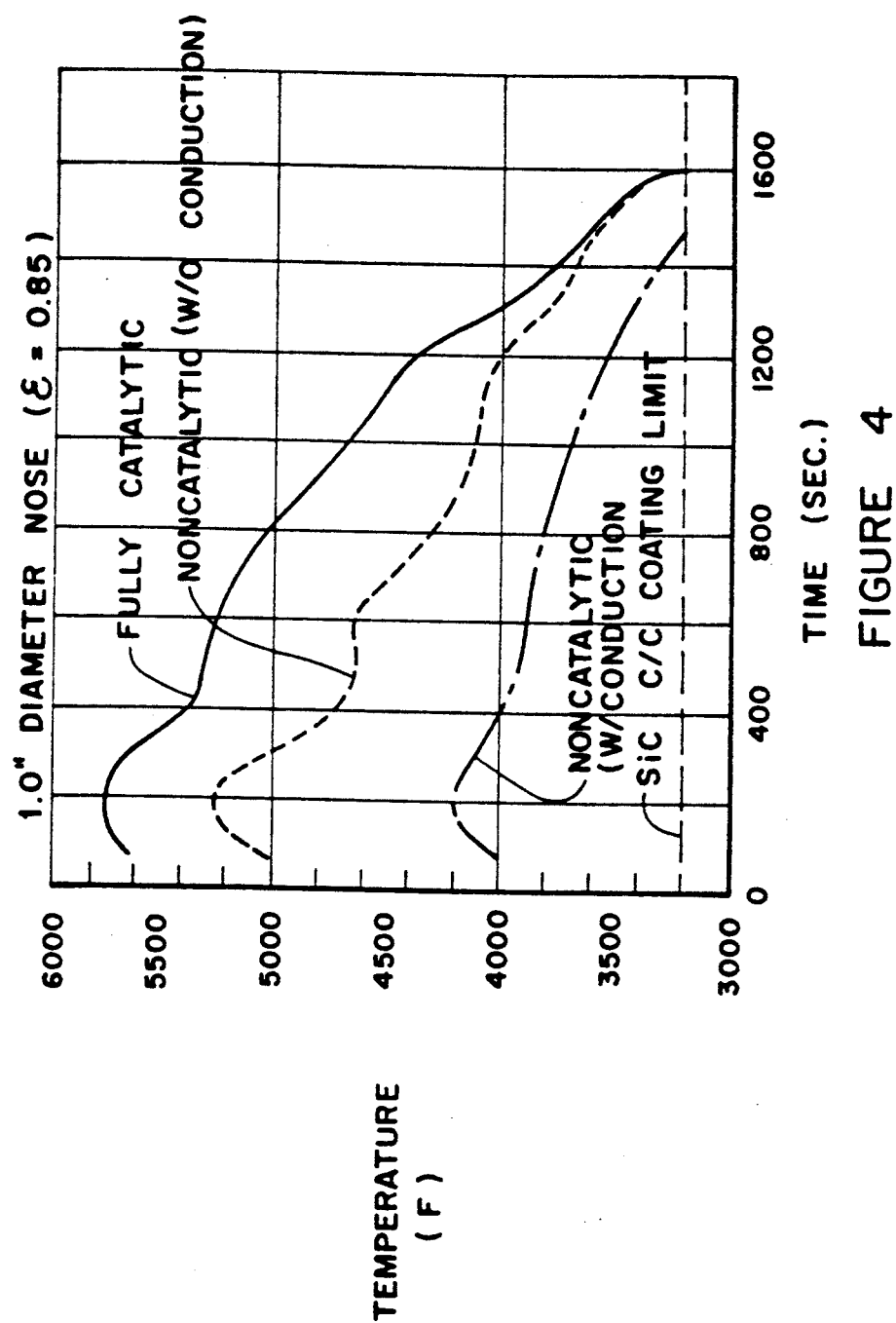

DUAL-MODE SEMI-PASSIVE NOSETIP FOR A HYPERSONIC WEAPON

BACKGROUND OF THE INVENTION the invention relates to cooling system and more particularly to a system that can be used for cooling the nosetip of a hypersonic weapon during its hypersonic mission.

Rockets, rocket craft and projectiles which are caused to travel through the atmosphere at very high rates of speed are subject to an extreme rise in temperature due to aerodynamic heating. The temperatures thus produced may even be above the melting point of any available metal or other material which is suitable for use in the outer casings of such projected devices.

Several designs and systems have been developed to cool a nosetip of the rockets and projectiles. Most of these use a variation of the heat pipe designs. In U.S. Pat. No. 2,922,291 the inventor discloses a simple metallic jacket with a coolant such as water circulating through it. U.S. Pat. Nos. 3,267,857 and 3,682,100 also use the heat pipe approach with the added advantage of using the endothermic reaction of the hydrides. Another system is illustrated in U.S. Pat. No. 4,739,952 which discloses the use of evaporative material carried in the missile structure which is ejected by vapor pressure through openings in the missiles outer skin and cools the missile as it flows along its outer surface.

Most of the prior art systems require the pumping of fluids at some level of their design. Some of the disadvantages of these types of systems are the fact that liquid systems tend to dynamically shift the center of gravity depending on the flight environment (i.e. acceleration, vehicle attitude, angle-of-attack). Also these systems require pumps for pressurizing the flowing fluid which adds to the requirement for an active system thus decreasing the overall system reliability. The weight of a pumping system will be greatly increased in small vehicles due to the pump and power components (batteries).

It is an object of the invention to provide a novel cooling system for the nosetip of hypersonic weapons that eliminates the disadvantages of liquid systems.

It is also an object of the invention to provide a novel cooling system for the nosetips of hypersonic weapons that eliminates the need for a pump such as is required by active systems that circulate the liquid through them.

It is another object of the invention to provide a novel cooling system for the nosetip of hypersonic weapons that eliminates the additional weight required by active systems that utilize pumps and power components.

It is an additional object of the invention to provide a novel cooling system for the nosetips of hypersonic weapons in the form of a passive system that not only eliminates additional weight but as the sublimation process is occurring the vehicles weight is decreasing thus improving the vehicles performance.

It is a further object of the invention to provide a novel cooling system for the nosetip of hypersonic weapons that not only incorporates the heat capacitants of the endothermic reaction of the sublimating material but also provides for the pressurization of these products for additional sub or supersonic impingement cooling in the localized area of the extremely high temperature stagnation region.

SUMMARY OF THE INVENTION

One of the major design issues of hypersonic weapons is the capability of the nosetip to withstand the hostile environment of the hypersonic mission. Thermal loads in the range of 4000 to 6000 degrees fahrenheit are common during a typical hypersonic mission. Often there is a segment of a mission where the thermal load produces nosetip surface temperatures exceeding all potential coatings and substrate materials maximum use temperatures. There is no doubt that active cooling systems such as transpirational, film cooling, etc. can be designed to meet this requirement with the associated increase in risk, reliability, weight, volume and cost.

The inventor's novel dual mode semi-passive nosetip (DMN) provides an unique solution for the hypersonic mission. The concept is based on utilizing the advantages of both a sublimating and impingement cooling design. A cone-shaped capsule or pressure vessel is positioned within the nosetip and provided with a predetermined lateral spacing between the two. A nozzle is formed adjacent to the front end of the capsule in the vicinity of the stagnation region of the nosetip. Sublimating material in the form of a solid state substance placed in the interior of the capsule. When the surface temperatures of the nosetip become sufficiently elevated, the heat is conductively transmitted through the walls of the capsule and then is conducted/radiated to the sublimating material thereby converting the solid state material into a vapor while increasing the internal pressure within the capsule. The sublimated particles in their vapor form are directed in an impingement stream through the nozzle of the capsule against the inner surface of the shell of the nose tip in its stagnation region thereby enhancing the cooling. These vaporized particles continue their travel along the annular space separating the capsule from the nose cone to provide additional cooling of the nose tip and are then vented down stream. Thus with the novel design there are two modes of heat reduction, the heat of sublimation and the enhanced forced convection due to the impinging stream. The capsule may be formed of highly conductive refractory material and interior fins can be provided which will increase by approximately 30 percent the sublimating surface area thus allowing optimization of internal pressure and/or impinging mass flow. The inner surface of the nosetip shell would be made of high temperature carbon-carbon or a refractory composite of similar thermal characteristics.

The novel cooling system eliminates the disadvantages of conventional liquid systems now being used. By using the solid state sublimator the weight distribution can be programmed in time by the internal fin design. The pump and battery components of active systems has been eliminated in the novel passive system which not only eliminates additional weight but as the sublimation process is occurring the vehicles weight is decreasing thus improving the vehicles performance. The novel design has a major advantage over similar designs since it incorporates not only heat capacitants of the endothermic reaction of the sublimating material but these products are then pressurized for an additional sub or supersonic impingement cooling in the localized area of the extremely high temperature region.

DESCRIPTION OF THE DRAWINGS

FIG. 2 is a cross sectional view taken along lines 2—2 of FIG. 1;

FIG. 3 is a cross sectional view taken along lines 3—3 of FIG. 1;

FIG. 4 is a graph illustrating a typical load to the nosetip during a typical hypersonic mission; and FIG. 5 shows the parametric study results of the heat transfer coefficient, stagnation heat transfer and surface temperature.

DESCRIPTION OF THE PREFERRED EMBODIMENT

Figure 1:
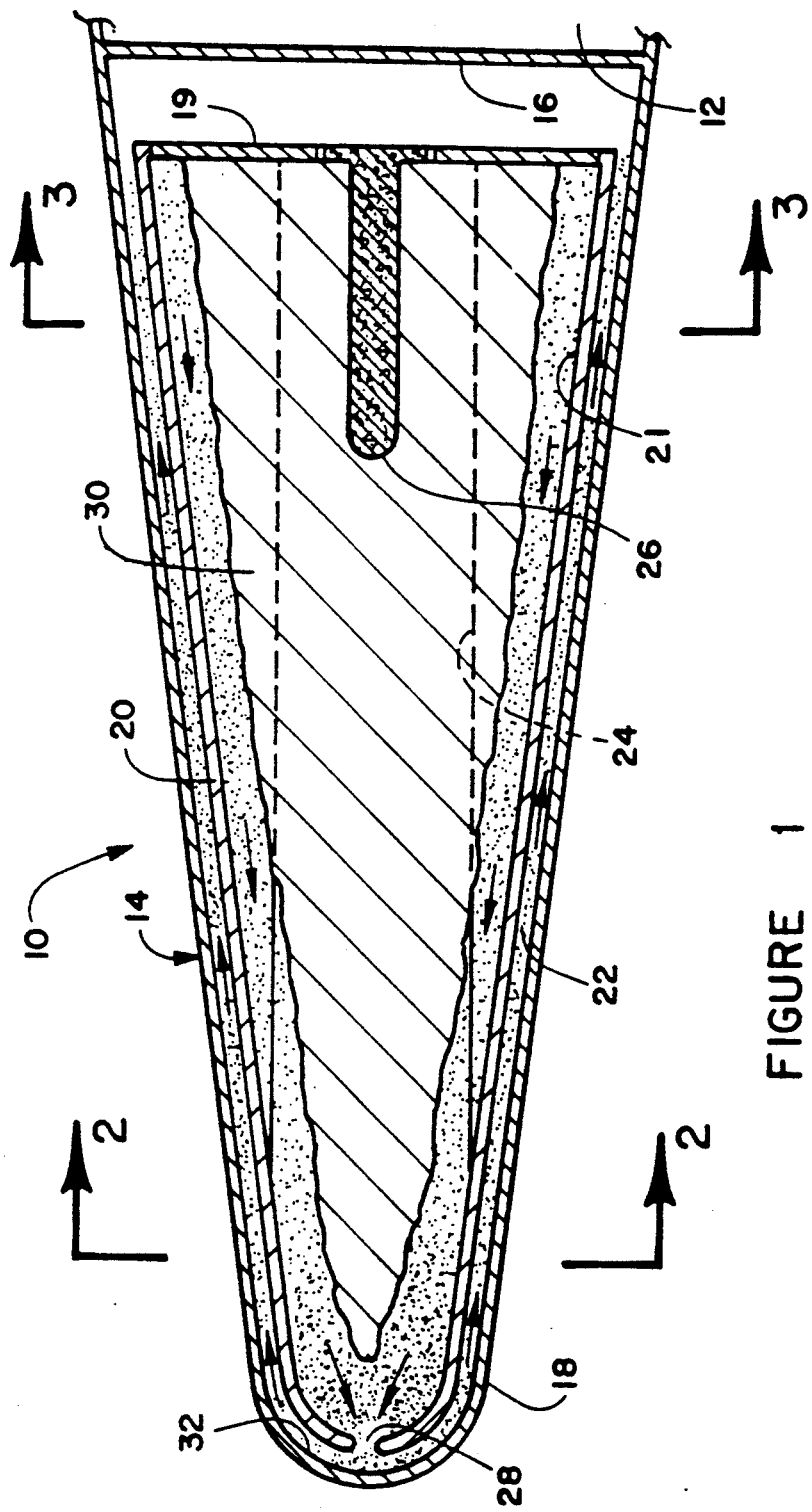
FIG. 1 is a side elevation view of a hypersonic weapon with portions shown in cross section.

The novel cooling system for the nosetip of a hypersonic weapon will now be described by referring to FIGS. 1–6 of the drawings. The hypersonic weapon is generally designated numeral 10. It has a main body 12 that is separated from the nosetip 14 by a wall 16.

The structure of the nosetip is best illustrated in FIGS. 1–3. A nosetip 14 is formed from a shell 18 that is made of high temperature carbon-carbon or a refractory composite of similar thermal characteristics. The shell 18 is cone shaped and it has a rear wall 19. A cone-shaped capsule or pressure vessel 20 is positioned within nosetip shell 18 with a predetermined spacing between their respective outer and inner surfaces. The area between their respective outer and inner surfaces functions as a discharge chamber 22. The capsule 20 is made of a highly conductive refractory material and has radially inwardly extending fins 24 and an inwardly extending insulated spike 26 for support of the sublimating material. The design of the fins can provide up to approximately a 30 percent increase in sublimating surface area which will allow optimization of internal pressure and/or impinging mass flow. A sublimating material such as Teflon or a derivative is encased within the primary storage chamber 21 in capsule 20. The capsule 20 conducts/radiates heat to the sublimating material. The capsule 20 also has a formed nozzle 28 in the stagnation region 32 of the nose tip which provides the impingement stream of sublimation material to the backside of the external nose tip shell 18. With this design, there are two modes of heat reduction, the heat of sublimation and the enhanced forced convection due to the impinging stream.

FIG. 4 is a graph that illustrates a thermal load to the nosetip during a typical hypersonic mission reaching a peak heating of 600 btu/ft$^2$-S. As shown there is a segment of the mission where the thermal load produces nose tip surface temperatures exceeding all potential coatings and substrate materials maximum use temperatures. A one dimensional heat transfer model was developed to determine the characteristics of the material employed in the design. FIG. 5 shows the parametric study results of the heat transfer coefficient, stagnation heat transfer and surface temperature. This analysis was based on a sublimation temperature of 1500 degrees fahrenheit and a capsule emissivity of 0.8. The preliminary results indicate that for a stagnation point heat transfer of 600 BTU/FT$^2$-S a heat transfer coefficient of 0.17 is required to keep the temperature below 3000° F. This value falls somewhere between stagnation air and water which is achievable as there is a significant enhancement due the subsonic or supersonic impingement. Materials with a lower sublimination temperature or increased heat capacitance will greatly improve these preliminary results.

While specific embodiments of the dual mode semi-passive nosetip for a hypersonic weapon has been shown and fully explained above for the purpose of illustration it should be understood that many alterations, modifications and substitutions may be made to the instant invention disclosure without departing from the spirit and scope of the invention as defined by the appended claims.

What is claimed is:

1. A dual mode semi-passive nosetip for a hypersonic weapon comprising;
   - an elongated nosetip having a front end, a rear end and a predetermined length;
   - said nosetip being formed of a shell that is substantially cone-shaped with its width decreasing from its rear end to its front end, said front end having an outer surface and an inner surface and a stagnation region adjacent said inner surface;
   - a cone-shaped capsule having a front end and a rear end closed by a rear wall having an inner surface, said capsule being formed of a hollow shell whose interior forms a primary storage chamber;
   - sublimating material in a solid state is received in said primary storage chamber;
   - said capsule being smaller in length and width than the shell of said nosetip and it is positioned within said nosetip with a predetermined spacing between them that forms a discharge chamber for said sublimating material after it has been heated from a solid state into a vapor; and
   - means for directing an impinging stream of said sublimation material against the inner surface of the shell of said nosetip adjacent said stagnation region when said sublimating material is heated from a solid state to a vapor state thereby cooling the temperature of the front end of the nosetip.

2. A dual mode semi-passive nosetip as recited in claim 1 wherein said means for directing an impinging stream of sublimation material against the inner surface of the shell of said nosetip comprises a nozzle formed at the front end of said capsule.

3. A dual mode semi-passive nosetip as recited in claim 1 wherein the inner surface of said nosetip shell is made of high temperature carbon-carbon.

4. A dual mode semi-passive nosetip as recited in claim 1 wherein the inner surface of said nosetip shell is made of a refractory composite.

5. A dual mode semi-passive nosetip as recited in claim 1 further comprising a plurality of inwardly extending radial heat transmission fins on the inner walls of said capsule.

6. A dual mode semi-passive nosetip as recited in claim 1 further comprising an insulated spike extends inwardly from the inner surface of the rear wall of said capsule.

* * * * *